(12) United States Patent
Makita et al.

(10) Patent No.: US 6,385,392 B1
(45) Date of Patent: May 7, 2002

(54) DATA PROCESSING APPARATUS AND DATA PROCESSING METHOD

(75) Inventors: Takeshi Makita; Satoshi Maeda, both of Kanagawa (JP)

(73) Assignee: Sony Corporation (JP)

(*) Notice: Subject to any disclaimer, the term of this patent is extended or adjusted under 35 U.S.C. 154(b) by 0 days.

(21) Appl. No.: 09/254,750

(22) PCT Filed: Jul. 10, 1998

(86) PCT No.: PCT/JP98/03115
§ 371 Date: May 6, 1999
§ 102(e) Date: May 6, 1999

(87) PCT Pub. No.: WO99/03274
PCT Pub. Date: Jan. 21, 1999

(30) Foreign Application Priority Data

Jul. 12, 1997 (JP) ............................................. 9-202198

(51) Int. Cl.[7] .............................................. H04N 5/911
(52) U.S. Cl. ........................... 386/113; 386/116; 360/55
(58) Field of Search .......................... 386/1, 21, 45–47, 386/113, 116, 125–126, 104; 360/51, 55, 69, 27, 114, 132

(56) References Cited

U.S. PATENT DOCUMENTS 5,170,388 A * 12/1992 Endoh ........................ 386/104
5,485,433 A * 1/1996 Satomura et al. ............ 360/114
6,034,828 A * 3/2000 Hamanaka et al. ............ 386/47

FOREIGN PATENT DOCUMENTS

| EP | 0 664647 A2 | 7/1995 |
| EP | 0786719 A2 | 7/1997 |
| EP | 0 786 719 | * 7/1997 |
| JP | 7-235143 | 9/1995 |
| JP | 9-149354 | 6/1997 |
| JP | 9-200673 | 7/1997 |
| JP | 9-282801 | 10/1997 |

* cited by examiner

Primary Examiner—Thai Tran
Assistant Examiner—Christopher Onuaku
(74) Attorney, Agent, or Firm—Bell, Boyd & Lloyd LLC

(57) ABSTRACT

When data including video and/or audio data is dispersed into data each having a predetermined unit and recorded in a non-linear accessible recording medium, or reproducing data dispersed and recorded, in case that the status information is not output in a predetermined period, it is decided that an error occurred to perform an error processing. Also, when data including video and/or audio data is dispersed into data each having a predetermined unit and recorded in a non-linear accessible recording medium with a redundancy, in case that an error occurred, which can be corrected within the redundancy, the fault information is recorded and the data is restored immediately by using the redundancy when the data of which an error occurred is reproduced based on the fault information.

21 Claims, 9 Drawing Sheets

DATA PROCESSING APPARATUS AND DATA PROCESSING METHOD

TECHNICAL FIELD

The present invention relates to a data processing apparatus and a data processing method with respect to data which includes video and/or audio data.

BACKGROUND ARTS

Recently, with the multiplication of channels for providing information in accordance with the spread of CATV (Cable Television), requests for new functions which can not be performed in a conventional VTR (Video Tape Recorder) are increasing, the new functions which can simultaneously record and reproduce a plurality of video/audio data in one video/audio data recording and reproducing apparatus or which can reproduce data while recording. To comply with these requests, an apparatus called video server (or AV (Audio and/or Video) server) for recording and reproducing images and/or sounds by using a random accessible recording medium such as a hard disk has been spreading.

Generally, a video server in a broadcasting station needs to have a large capacity of memory, in order to record a long term data in addition to a high transmission rate of necessary data due to requests of high picture quality and high sound quality. Then, a data recording and reproducing apparatus including a plurality of hard disks (hereinafter, referred to as HD) which can store video/audio data and can process in parallel is used to attempt to speed up a transmission rate and enlarge a capacity of memory, and to further attempt to secure the reliability by previously recording parity data if any of HD devices is out of order. Thereby, even if the channel numbers are different depending on the contents of programs tried to be provided by a broadcasting station and depending on the broadcasting form, material data comprising a plurality of audio/video data is recorded dispersedly to simultaneously output the data through multiple channels and to reproduce the same material data through the multiple channels with the reproduction time being shifted, so that a multichannel video server which can correspond to various usage forms such as the construction of systems of VOD (Video on Demand) or NVOD (Near Video on Demand) can be realized.

The data recording and reproducing apparatus used as the video server uses the RAID (Redundant Arrays Inexpensive Disks) techniques which is constructed by a plurality of hard disk drives (HDD) each comprising further a plurality of hard disks which has been described in a thesis ("A Case for Redundant Arrays of Inexpective Disks (RAID)", ACM SIGMOND Conference, Chicago, Ill., Jun. 1–3, 1988) published by Patterson, 1988.

In the thesis described above, the RAID is classified into five, RAID-1 to RAID-5. The RAID-1 is a method of writing the same contents in two HDD. The RAID-3 is a method of dividing input data into a specific size to record it in a plurality of HDD, and forming parity data being exclusive OR of data block which corresponds to each HDD to write it in another single HDD. The RAID-5 is a method of enlarging a dividing unit (block) of data to record one divided data as data block in a single HDD, and recording the result of operating exclusive OR of data block which corresponds to each HDD (parity data) as a parity block in the other HDD and dispersing the parity block into the other HDD.

FIG. 9 shows the construction of the disk array apparatus described above.

The input data D1 is input to a disk array controller and is divided and dispersed into a predetermined unit (e.g., one byte unit or one bit unit) to be recorded in a plurality of hard disk drives (referred to as HDD) 2A to 2H. At the time of dispersion, the disk array controller calculates the parity data of the input data D1 and records it in a HDD 2H for parity data. At the time of reproduction, when the data dispersedly recorded in any of HDD 2A to 2G fails to be read, the parity data recorded in the HDD 2H for parity data is read to perform parity operation so as to perform an error correction. The data is thereby restored to be output.

However, at the time of recording or reproduction, when the data is not recorded or reproduced correctly due to a trouble of one of the HDD 2A to 2G and a trouble of one hard disk, a repeat processing (retry processing) is performed on the HDD 2A to 2G to repeatedly record or reproduce the data. Since the retry processing is repeatedly performed in this way, successively input data or data to be output can not be processed at a real time.

Specially, in case of using the disk array apparatus used in a broadcasting station as a recording and reproducing apparatus for recording and reproducing video and/or audio data or as a data outputting apparatus for outputting data actually used on a broadcasting, programs can not be broadcasted at a real time.

DISCLOSURE OF INVENTION

This invention is to solve the problems described above, and to provide a data outputting apparatus and the method thereby which can actually deal with a recording and reproduction processing at a real time.

BEST MODE FOR CARRYING OUT THE INVENTION

Hereinafter, the embodiment of this invention will be described in details referring to the figures.

Figure 1:
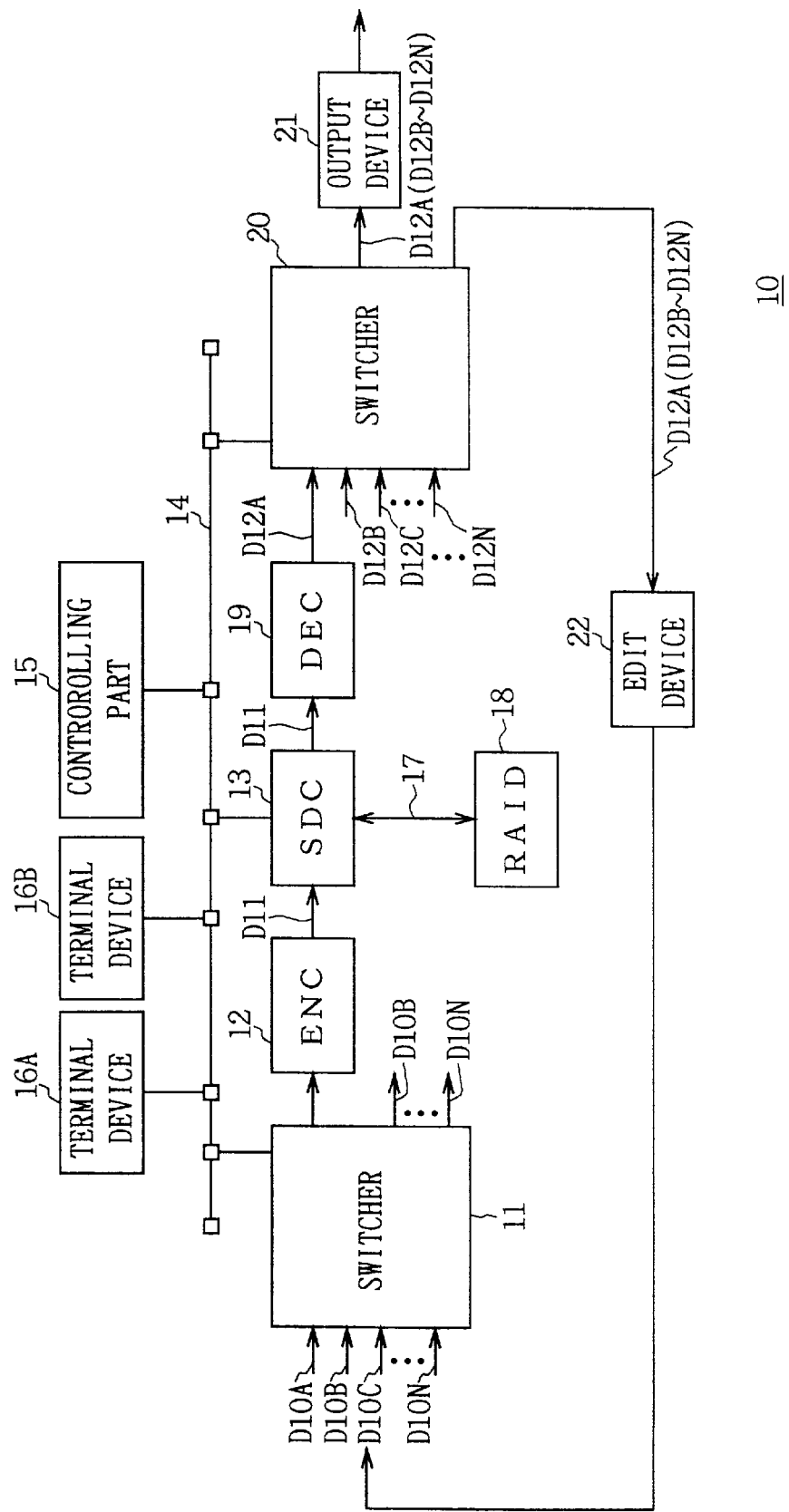
FIG. 1 is a block diagram showing the construction of an AV data storage edit output system to which the present invention is applied.

FIG. 1 shows a data output system 10. The data storage output system 10 comprises: a switcher 11 for switching data (referred to as AV data in this embodiment) including input video and/or audio data to a predetermined output line; an encoder 12 for converting the AV data output from the switcher 11 into data which can be easily stored in a storing medium, such as compressed or format-converted data; a server data controller (SDC) 13 for outputting the AV data output from the encoder 12 to a RAID 18 via a SCSI interface 17 based on the control command from an upper controlling part 15 and terminal devices 16A, 16B, and for outputting the AV data stored in the RAID 18 to a decoder 19 via a bus 17 based on the control command from the upper controlling part 15 and the terminal devices 16A, 16B; a decoder 19 for performing a processing such as extension or format-conversion on the AV data output from the SDC part; a switcher 20 for switching the output from the decoder 19; and an output device 21 for receiving the output from the switcher 20 and actually outputting the AV data for broadcasting.

The AV data D10A, D10B, . . . , D10N input to the switcher 11 are data which are transmitted via a satellite circuit or reproduced by a VTR from a video tape in which the data taken by a Camcorder is recorded or taken by a studio camera.

In the switcher 11, the AV data D10A, D10B, . . . , D10N are switched by the control of the terminal devices 16A, 16B or the upper controlling part 15 to be output to a predetermined output line.

The AV data D10A, D10B, . . . , D10N output from the switcher 11 are input to the encoder (ENC) 12. The AV data D10A, D10B, . . . , D10N output from the switcher 11 are respectively input to encoders (not shown) which have the same construction as the encoder 12 to which the AV data D10A is input. Then, the input AV data D10A, D10B, . . . , D10N are controlled by an input/output processing part (not shown) which includes an encoder 12 and a decoder 19. For example, the input AV data D10A is processed (such as processing by the encoder 12) in the time slot assigned, and then the input AV data D10B is processed in the time slot assigned next. In this way, the time division processing is performed and it seems that a plurality of input/output processing are performed simultaneously.

Here, one of the input AV data D10A is watched and described below.

The AV data D10A output from the switcher 11 is input to the encoder 12, where it is compressed or format-converted. The MPEG2 method utilizing the interframe correlation or the DV method prescribed as a home digital VTR is used for the compression processing. The encoded AV data D10A is output to the server data controller 13.

The server data controller 13 receives the AV data D11 output from the encoder 12, and outputs the AV data D11 to the RAID 18 connected via the SCSI interface based on the control command of the upper controlling part 15 or the terminal devices 16A, 16B.

The server data controller 13 is connected with the upper controller 15 and the terminal devices 16A, 16B via a LAN (Local Area Network) 14.

The upper controlling part 15 controls devices connected thereto, for example, a plurality of RAIDs if they exist and a plurality of encoders if they exist, and further controls an input/output channel.

The terminal devices 16A, 16B specify a starting point for reproduction of AV data or the output time from a broadcasting list of a program which are displayed on a display means such as a monitor (not shown) as a GUI (Graphic User Interface).

When the terminal devices 16A, 16B specify the starting point of AV data to be output or the output time, the control data which contains the specified data is input to the upper controlling part 15 via the LAN 14, and the control data from the upper controlling part 15 is input to the server data controller 13, and then the AV data D11 recorded in the RAID 18 is output actually.

The AV data D11 controlled as described above and output from the server data controller 13 is output to the decoder (DEC) 19.

When the AV data D11 output from the SDC 13 is data compressed by the encoder 12, the decoder 19 extends it by an extending method corresponding to the compression processing of the encoder 12, and when the AV data D11 is data encoded into a predetermined format by the encoder 12, the decoder 19 decodes it by a method corresponding to the predetermined format of the encoder 12.

The AV data D10A, D10B, . . . , D10N decoded by the decoder 19 are output to the switcher 20.

The switcher 20 switches the input AV data D10A, D10B, . . . , D10N by the control of the upper controlling part 15, and outputs the AV data D12A, D12B, . . . , D12N.

More specifically, the controlling part 15 controls the switcher 20 to output the data to be output to a desired output device 21 or an edit device 22.

The edit device 22 receives the AV data D12A, D12B, . . . , D12N output from the switcher 20, and edits it for example as the AV data for actually broadcasting. The edited AV data is input to the switcher 11 again.

The whole construction of the data output system 10 shown in FIG. 1 has been described above. However, other various data output systems can be constructed.

For example, the edit device 22 can directly receive the AV data D12A, D12B, . . . , D12N from the decoder 19, and the data edited by the edit device 22 can directly be output to the encoder 12. Further, the data directly input from the SDC 13 to the edit device 22 to be edited can be input to the SDC 13 again.

Also, not only the AV data D12A, D12B, . . . , D12N of which the AV data stored in the RAID 18 is decoded, but also the AV data taken at a studio can be input to the switcher 20 to be switched by the control of the upper controlling part 15 and output, although this is not shown in the figure.

Further, the input AV data D10A, D10B, . . . , D10N are encoded via the switcher 11, but they can be directly input without the switcher 11. This is because a plurality of inputs are respectively operated in the assigned time slots as described above, so that the AV data can be directly input without the switcher 11. More over, the apparatus can be constructed without the switcher 20. In this case, similarly, time slots are respectively assigned to a plurality of output channels, and the data output from the decoder 19 can be output to the output device 21, to the edit device 22, or to a specified room such as a control room in the station (not shown), in the assigned time slot. The time slot can be assigned based on the control data from the controlling part 15 or based on the time slot which appears at a predetermined time at the SDC 13.

Next, the whole operation of the AV data output system 10 is explained.

The AV data D10A, D10B, . . . , D10N input to the switcher 11 are switched by the control of the upper controlling part 15 or the terminal devices 16A, 16B so that a predetermined AV data of the AV data D10A, D10B, . . . , D10N is input. The input AV data D10A, D10B, . . . , D10N is converted into a predetermined format or compressed by a predetermined compression method by the encoder 12, to be output. The AV data D11 output from the encoder 12 is input to the server data controller (SDC) 13, and is recorded in the RAID 18 via the SCSI interface 17 by the control of the controlling part 15 or the terminal devices 16A, 16B. The AV data recorded in the RAID 18 is controlled by the instruction from the terminal devices 16A, 16B or the instruction from the controlling part 15 to be output to the decoder (DEC) 19. The AV data D11 output to the decoder 19 is performed with a processing contrary to the encoder 12, for example, an extension processing if the encoder 12 performed a compression processing, to be input to the switcher 20. The AV data D12A, D12B, ..., D12N input to the switcher 20 is controlled by the instruction from the terminal devices 16A, 16B or the controlling part 15 to be output to the output device 21 or the edit device 22. The AV data D12A, D12B, ..., D12N input to the edit device 22 is edited for a broadcasting to be output to the switcher 11 again, and the AV data D12A, D12B, ..., D12N input to the output device 21 is output as data for broadcasting output.

In this way, the AV data output system 10 can edit the data including the supplied video and/or audio data to a specified condition and can broadcast it at a specified time.

Figure 2:
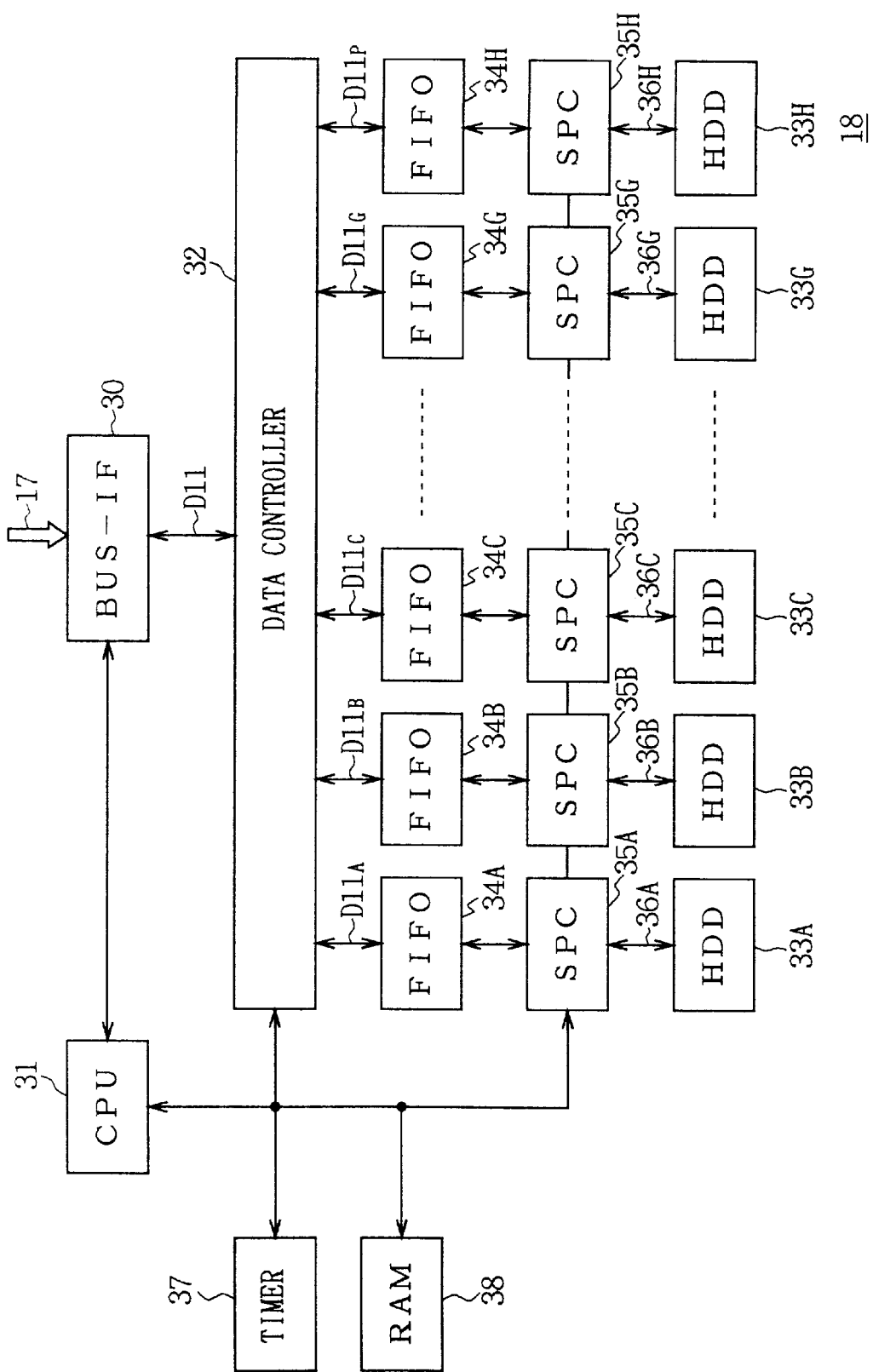
FIG. 2 is a block diagram showing the construction of a data recording and reproducing apparatus according to the present invention.

Next, the concrete construction of the RAID 18 for storing data including the video and/or audio data is explained with reference to FIG. 2.

The RAID 18 comprises: a BUS-IF 30 being the interface of the bus 17; a CPU 31 for controlling variously in the RAID; a data controller 32 for dispersing the AV data D11 input via the BUS-IF 30 into respective HDDs based on the control of the CPU 31; HDD (Hard Disk Drive) 33A, ..., 33H being a recording medium for recording the input AV data D11 and the parity data of the AV data D11; FIFO (First In First Out) 34A, ..., 34H for temporarily storing the AV data D11 dispersed by the data controller 32; SPC (SCSI Protocol Controller) 35A, ..., 35H for receiving the AV data from the FIFO 34A, ..., 34H and being an interface for making the HDD 33A, ..., 33H connected via SCSI interface (Small Computer System Interface) 36A, ..., 36H to input and output the AV data; and a timer 37.

The bus 17 between the SDC 13 shown in FIG. 1 and the BUS-IF 30 can superimpose the command data to the RAID 18 or the status data from the RAID 18 on the AV data D11 to transmit and receive it.

The command data generated at the SDC 13 and inserted into the AV data D11 is output from the BUS-IF 30 to the CPU 31, where the data controller 32 or the SPC 35A, ..., 35H are controlled according to the contents of the command data so as to record the AV data D11 in the HDD 33A, ..., 33H.

The AV data D11 output from the BUS-IF 30 is input to the data controller 32.

The data controller 32 generates the divided data $D11_A$ to $D11_G$ of which the input AV data D11 is divided for example by one byte, and generates the parity data $D11_P$ which is based on each of divided data $D11_A$ to $D11_G$. The parity data $D11_P$ may be the even numbered parity which sets $D11_P$ to "1" if the number of "1" in the divided data $D11_A$ to $D11_G$ is an even number, or may be the odd numbered parity which sets $D11_P$ to "1" if the number of "1" in the divided data $D11_A$ to $D11_G$ is an odd number.

Each of divided data $D11_A$ to $D11_G$ divided by the data controller 32 and the parity data $D11_P$ are respectively stored in each of FIFO memory 34A to 34G and 34H temporality. This is a temporary memory to absorb the AV data being the synchronous data input via each of HDD 33A to 33H and the BUS-IF 30 which operate asynchronously.

Each of divided data $D11_A$ to $D11_G$ and the parity data $D11_P$ which are temporarily stored in each of FIFO 34A to 34G are output to each of SPC 35A to 35G and 35H respectively. The SPC 35A to 35H are controlled by the CPU 31 so that the temporarily stored divided data $D11_A$ to $D11_G$ and the temporarily stored parity data $D11_P$ are read out and output to each of SPC 35A to 35H.

Each of divided data $D11_A$ to $D11_G$ and the parity data $D11_P$ which are respectively output to each of SPC 35A to 35H are recorded in each of HDD 33A to 33H via each of SCSI bus 36A to 36H by the control of the CPU 31.

The recording operation of the AV data D11 into the RAID 18 described above is explained.

A recording command is superimposed on the AV data D11 output from the SDC 13 to be input to the BUS-IF 30. The BUS-IF 30 controls the data controller 32 and the SPC 35A to 35H to output the command data to the CPU 31 and to record the AV data D11 in each of HDD 33A to 33H. While, the AV data D11 output from the BUS-IF 30 is input to the data controller, where it is divided by one byte and the parity data $D11_P$ is generated from the divided AV data D11.

Each of divided AV data $D11_A$ to $D11_G$ and the parity data $D11_P$ are temporarily stored in each of FIFO memory 34A to 34H, and read out by each of SPC 35A to 35H to be output to each of HDD 33A to 33H via each of SCSI bus 36A to 36H and then to be recorded.

At this time, each of HDD 33A to 33H outputs, to the CPU 31 via the corresponding SPC 35A to 35H, the data which includes the status information indicating whether or not the divided data $D11_A$ to $D11_G$ and the parity data $D11_P$ are recorded correctly in each of HDD 33A to 33H (information indicating "Good" when recorded correctly, and "Check Condition" when not recorded correctly).

Thereby, at the time of recording the AV data D11 in the RAID 18, when a recording error occurred in one of HDD 33A to 33H, the CPU 31 can identify which of HDD 33A to 33H has a recording error based on the status information supplied through the SPC 35A to 35H corresponding to each of HDD 33A to 33H.

Next, the reproduction operation of the AV data D11 recorded in the RAID 18 is explained.

When a reproduction command output from the SDC 13 via the bus 17 is input to the BUS-IF 30, the reproduction command is output to the CPU 31. The CPU 31 receiving the reproduction command issues the reproduction control direction to the SPC 35A to 35H and the data controller 32, and each of SPC 35A to 35H reproduces the divided AV data $D11_A$ to $D11_G$ and the parity data $D11_P$ which have been recorded in each of HDD 33A to 33H to store them in the corresponding FIFO memory 34A to 34H.

At this time, each of HDD 33A to 33H outputs, to the CPU 31 via each of SPC 35A to 35H, the status information indicating whether or not the specified divided data $D11_A$ to $D11_G$ and the parity data $D11_P$ are reproduced correctly from each of HDD 33A to 33H (information indicating "Good" when reproduced correctly, and "Check Condition" when not reproduced correctly. At this time, in order to distinguish the information from the status information indicating whether or not the data is recorded correctly in the above-mentioned recording operation, one bit flag is put before the status information so as to indicate a different status information between the recording operation and the reproduction operation).

Then, when obtaining the status information indicating "Good" from all of HDD 33A to 33H, the CPU 31 sets the operation of the data controller 32 to a normal operation mode, and forms the AV data D11 from the divided data $D11_A$ to $D11_G$ obtained from the FIFO 34A to 34G to output it to the BUS-IF 30.

On the other hand, when obtaining the status information indicating "Check Condition" from one of HDD 33A to 33H, the CPU 31 sets the operation of the data controller 32 to a parity correction mode, and does not read the data of corresponding HDD 33A to 33G which obtains the status information "Check Condition" therefrom from the corresponding FIFO 34A to 34G, and performs a parity correction processing by the divided data $D11_A$ to $D11_G$ obtained from the other HDD 33A to 33G and the parity data $D11_P$. The CPU 31 then forms again the data which can not be reproduced correctly.

The AV data correctly read by the data controller 32 or parity-corrected is output to the BUS-IF 30, and further output from the BUS-IF 30 to the SDC 13 via the bus 17.

In the RAID 18 having the described construction and operation, in the recording operation described above for recording the AV data D11 supplied through the bus 17 to each of the HDD 33A to 33H and in the reproducing operation described above for reproducing the data recorded in each of the HDD 33A to 33H, a timer 37 is started at the time of the recording and reproducing operation of each of the SPC 35A to 35H to count a predetermined period.

After a predetermined period has elapsed in the count time of the timer 37, if the status information is not given to the CPU 31, error information D20 (hereinafter, referred to as fault HDD information) which corresponds to any of the HDD 33A to 33H from which the status information is not returned is stored in the RAM 38.

Regarding the error information D20, a recording error that the divided data $D11_A$ to $D11_G$ and the parity data $D11_P$ to be recorded can not be recorded in each of the HDD 33A to 33H due to any factor, or a reproducing error that the divided data $D11_A$ to $D11_G$ and the parity data $D11_P$ to be reproduced can not be reproduced from each of the HDD 33A to 33H occurred in any of the HDD 33A to 33H.

As described about the conventional technique, when the recording error or the reproducing error occurred in a conventional RAID 18, the recording or reproducing operation is repeated again and again.

In the RAID 18 for broadcasting in which the recording or reproduction of the AV data is requested at a real time, since the recording or reproducing operation is repeated again and again, the AV data can not be recorded in the RAID 18 at a real time.

Then, when a time out is provided and the status information is not returned from any of HDD 33A to 33H within a predetermined period, the fault HDD information representing any of HDD 33A to 33H from which the status information is not returned is previously stored in the RAM 38, and the data of any of the HDD 33A to 33H corresponding to the fault HDD information is set to a parity correction mode by the data controller 32 at the time of reproduction, so as to perform parity correction, and the reconstructed AV data D11 is output to the BUS-IF 30.

Figure 3:
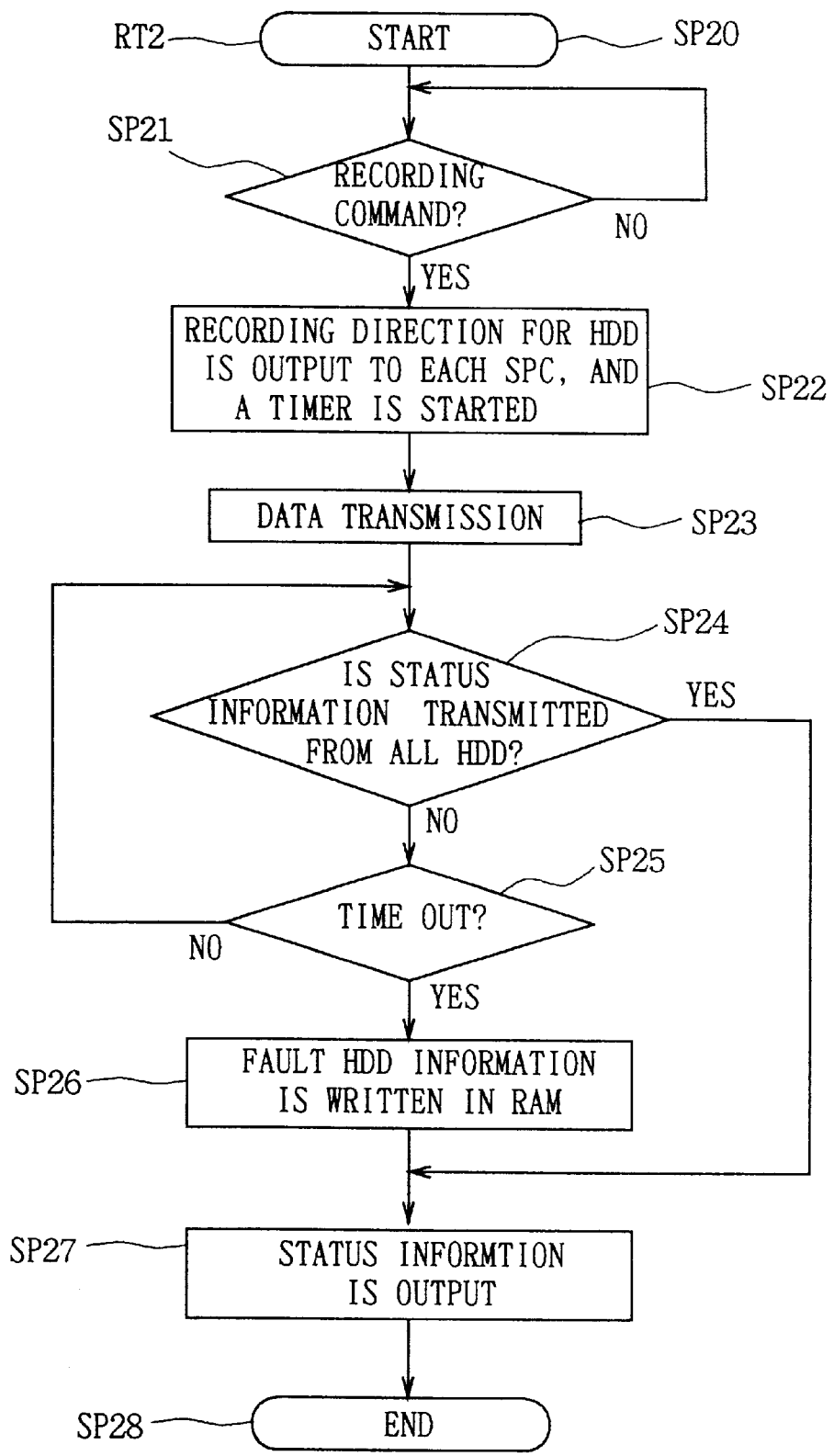
FIG. 3 is a flowchart showing the recording procedure.
Figure 4:
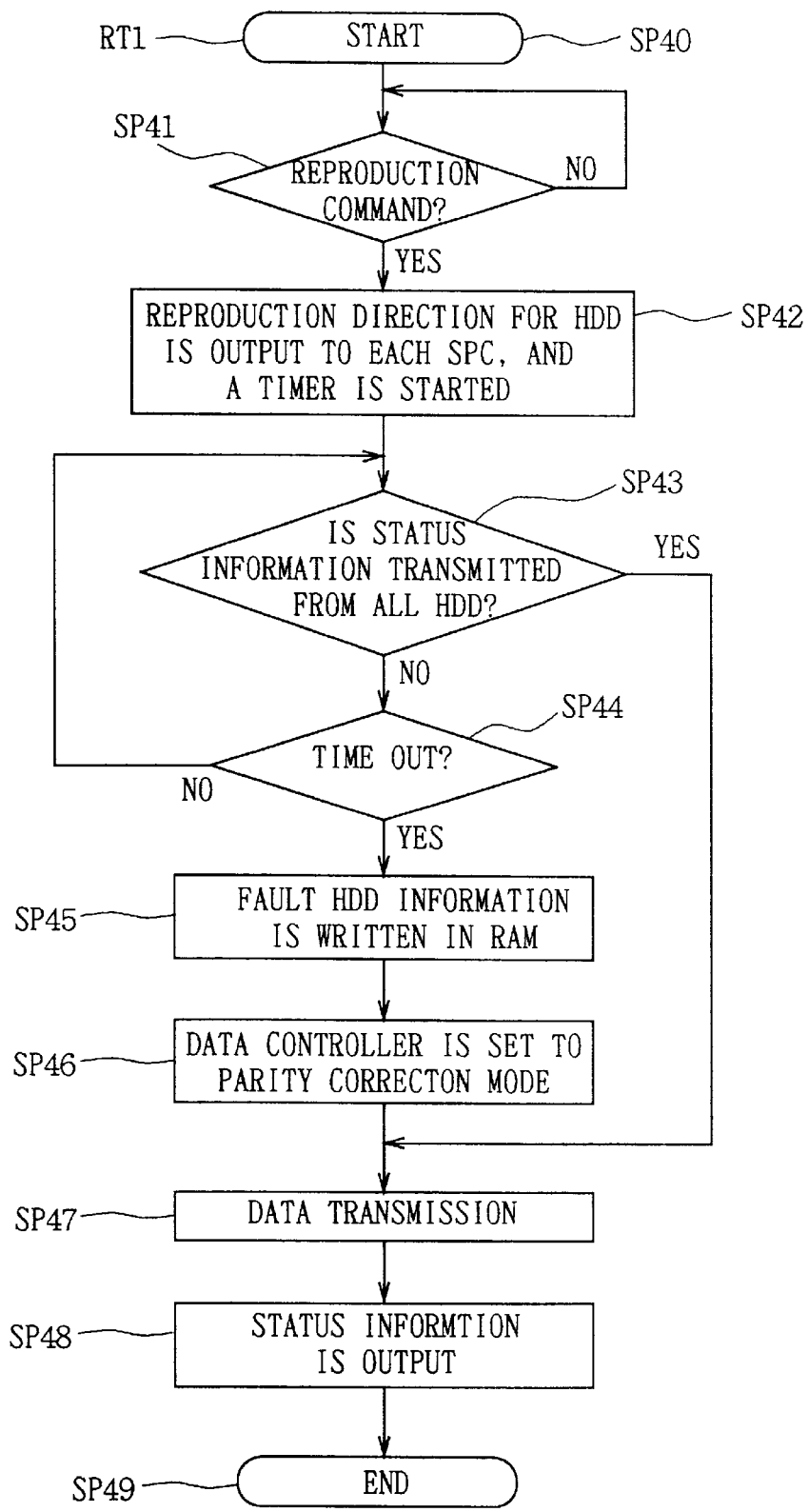
FIG. 4 is a flowchart showing the reproduction procedure.

This processing is explained in details referring to FIGS. 3 and 4.

FIG. 3 shows the recording procedure of the AV data in case of providing the time out.

When this processing is started (step SP20), it is judged that whether or not the recording command by which the RAID 18 is requested to record the AV data D11 is supplied from the server data controller (SDC) 13 (step SP21).

When the recording command is not supplied at step SP21 (when the result is "no"), the processing returns to step SP21 again to be repeated until the recording command is supplied.

When the recording command is supplied (when the result is "yes"), the processing proceeds to step SP22.

At step SP22, the recording control direction is issued from the CPU 31 to each of the SPC 35A to 35H, and the each of the SPC 35A to 35H is requested to record the AV data in each of the HDD 33A to 33H.

The CPU 31 starts the timer 37 in addition to issuing the recording control command.

Next, the processing proceeds to step SP23, where the AV data D11 transmitted from the SDC 13 is divided into data each having one byte, for example (or a predetermined data size such as one bit), and simultaneously the divided data $D11_A$ to $D11_G$ and the parity data $D11_P$ being the parity data of the divided data $D11_A$ to $D11_G$ are recorded in the HDD 33A to 33H via the FIFO 34A to 34H and SPC 35A to 35H.

Then, the processing proceeds to step SP24, where it is judged that whether or not the status information representing that whether or not the data is recorded correctly is transmitted from all of the HDD 33A to 33H to the CPU 31.

When all status information can be obtained (when the result is "yes"), the processing proceeds to step SP27, where the status information obtained from each of the HDD 33A to 33H is output from the BUS-IF 30 to the SDC 13 through the bus 17.

On the contrary to this, when the status information can not be obtained from all of the HDD 33A to 33H (when the result is "no"), the processing proceeds to step SP25, where it is judged that whether or not the count time counted by the timer 37 exceeds the time out period which has been previously set.

When it does not exceed the time out period (when the result is "no"), the processing proceeds to step SP24 again.

When it exceeds the time out period (when the result is "yes"), the processing proceeds to step SP26, where the fault HDD information representing any of HDD 33A to 33H from which the status information is not returned is stored in the RAM 38, and the status information of any of HDD 33A to 33H from which the status information is not returned is set to "Check Condition" to be output from the CPU 31 to the data controller 32 (step SP27).

The status information is output and then the processing is terminated (step SP28).

In this way, the CPU 31 obtains the information that which of HDD 33A to 33H has a recording error at the time of recording operation, and when the status information is not returned from any of HDD 33A to 33H after the time out, stores the information of any of HDD 33A to 33H from which the status information is not returned and simultaneously issues the status information "Check Condition" representing the recording error to the data controller 32.

The SDC 13 thereby executes the recording command based on the status information to proceed to the next processing immediately. This makes it possible to construct and control the data output system for broadcasting which can improve the recording processing speed of not only the RAID 18 but also the data output system 10 entirely and can record the data at a real time.

Next, referring to FIG. 4, the reproduction procedure of the AV data in case of providing the time out is explained.

When this reproduction processing is started (step SP40), it is judged that whether or not the reproduction command is supplied to the CPU 31 at step SP41.

When the reproduction command is not supplied (when the result is "no"), the processing returns to step SP41 again to be repeated until the reproduction command is supplied.

When the reproduction command is supplied (when the result is "yes"), the reproduction control direction by which each of the SPC 35A to 35H is requested to control the reproduction operation is issued and the timer 37 is started to count the time (step SP42).

Next, the processing proceeds to step SP43, where it is judged that whether or not the status information representing that whether or not the data is read correctly from all of the HDD 33A to 33H is transmitted to the CPU 31.

When the status information is transmitted from all HDD 33A to 33H to the CPU 31 (when the result is "yes"), the processing proceeds to step SP47.

At step SP47, when the status information are all "Good", the data controller 32 is set to a normal reproduction mode, and the AV data D11 is restored from the divided data $D11_A$ to $D11_G$ which are read from the HDD 33A to 33G to be transmitted to the SDC 13 via the BUS-IF 30. Further, the status information "Good" superimposed on the AV data D11 or the status information "Good" alone is transmitted to the SDC 13 through the BUS-IF 30.

At step SP47, when any of the status information is "Check Condition" among from the status information of all HDD 33A to 33G, the CPU 31 sets the data controller 32 to a parity correction mode, and performs parity-correction from the divided data $D11_A$ to $D11_G$ of the HDD 33A to 33G other than the HDD 33A to 33G which transmits "Check Condition" and the parity data $D11_P$ of the HDD 33H. Then, the divided data $D11_A$ to $D11_G$ of the HDD 33A to 33H which transmits "Check Condition" is corrected to restore the AV data D11.

The AV data D11 is transmitted from the BUS-IF 30 to the SDC 13 via the bus 17. More over, the status information superimposed on the restored AV data D11 or the status information alone is transmitted from the BUS-IF 30 to the SDC 13 through the bus 17.

On the contrary to this, when the status information is not transmitted from all of the HDD 33A to 33H (when the result is "no"), the processing proceeds to step SP44.

At step SP44, it is judged that whether or not the timer 37 started at step SP42 exceeds the time out period.

When it does not exceed the time out period (when the result is "no"), the processing proceeds to step SP43 again, and waits the status information to be transmitted from all HDD 33A to 33H to the CPU 31.

When it exceeds the time out period (when the result is "yes"), the processing proceeds to step SP45, where the fault HDD information described above is written in the RAM 38. Then, the processing proceeds to step SP46.

At the step SP46, the data controller 32 is set to a parity correction mode so that the original AV data D11 is restored by the parity correction processing described above, without waiting the status information to be transmitted from any of HDD 33A to 33H at which a reproduction error occurred. Then, the processing proceeds to step SP47.

At step SP47, since the CPU 31 regards, as a fault address, any of HDD 33A to 33H from which the status information is not transmitted to the CPU 31 in a predetermined time out period, the CPU 31 reads out the fault HDD information written at step SP45 in the RAM 38 and forms the status information "Check Condition", to transmit it from the BUS-IF 30 to the SDC 17 via the bus 17. Further, the data controller 32 creates the parity correction data from the parity data $D11_P$ and reconstructs the AV data D11 to be transmitted from the BUS-IF 30 to the SDC 13 via the bus 17 together with the status information or alone.

Then, the processing proceeds to step SP48 to be terminated.

In this way, the CPU 31 regards any of HDD 33A to 33H from which the status information is not issued after a predetermined time (after the time out period) as the HDD having a fault address, and forms the status information to be issued to the SDC 13. Thereby, this makes it possible to construct and control the data output system which cuts down the time loss due to repeatedly reading operation, as explained in a conventional technique, when failing in reading operation from each HDD, and which satisfy the real time characteristics required by a broadcasting station.

Note that the above-described embodiment has been dealt with the case where the time used by the CPU 31 is counted by the timer 37. However, it can be counted by using a pulse generating means other than the timer 37.

The above-described embodiment has been dealt with the case where at the time of recording or reproducing the AV data, the time out period is provided and if any information is not returned from the HDD after the time out period, the error information that the HDD is fault HDD is stored in the RAM 38. However, as the second embodiment, the following point is explained below. When a recording error occurred in any of HDD 33A to 33H, the fault information, such as an information which of HDD 33A to 33H has a recording error or the position of LBA (Logical Block Address) of the HDD 33A to 33H having a recording error, is stored in the RAM 37. Then, at the time of reproduction, when the HDD 33A to 33H having a recording error exists within the area of the divided data $D11_A$ to $D11_G$ desired to be reproduced, the data controller 32 is immediately set to a parity operation mode based on the fault information.

Figure 5:
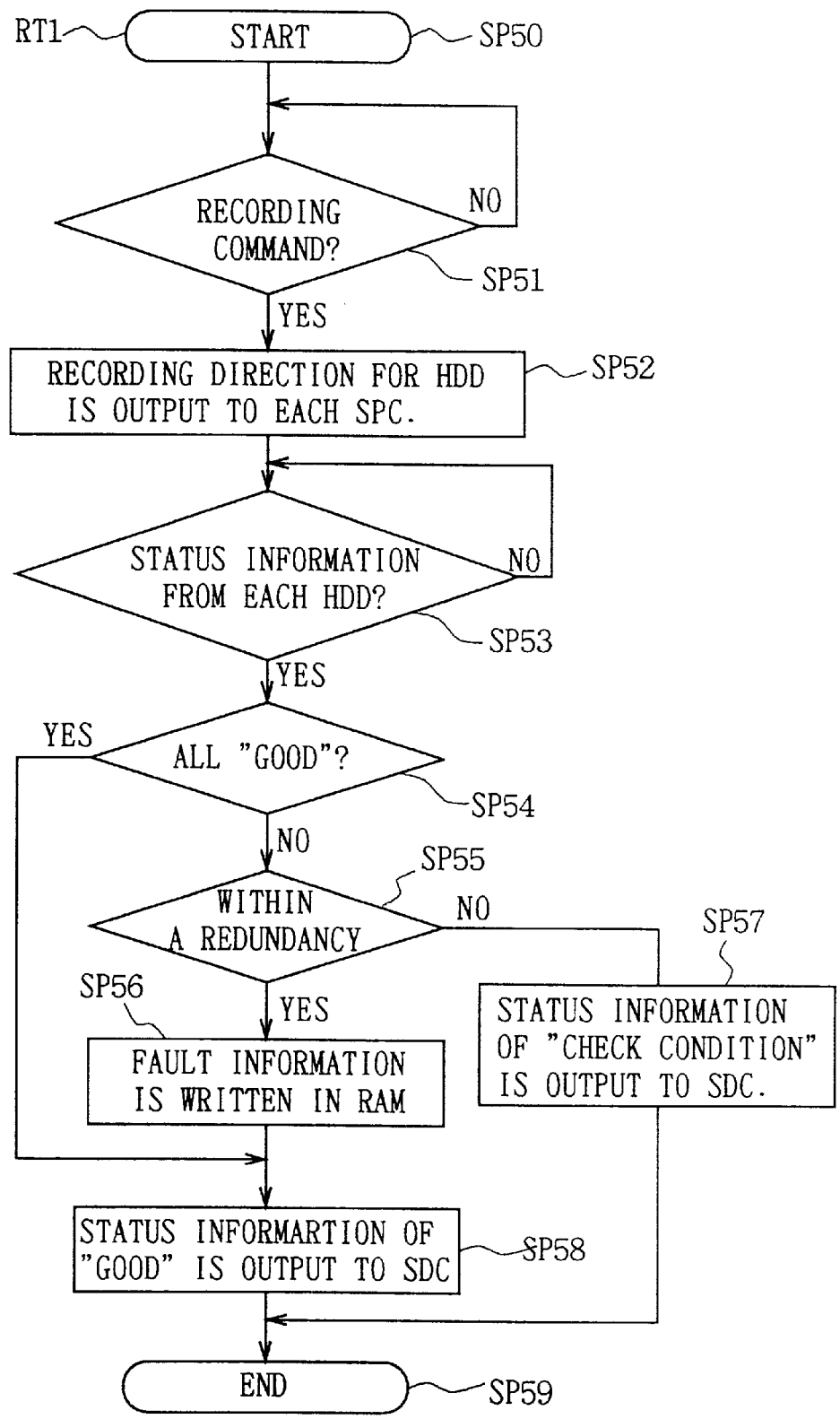
FIG. 5 is a flowchart showing the recording procedure.
Figure 6:
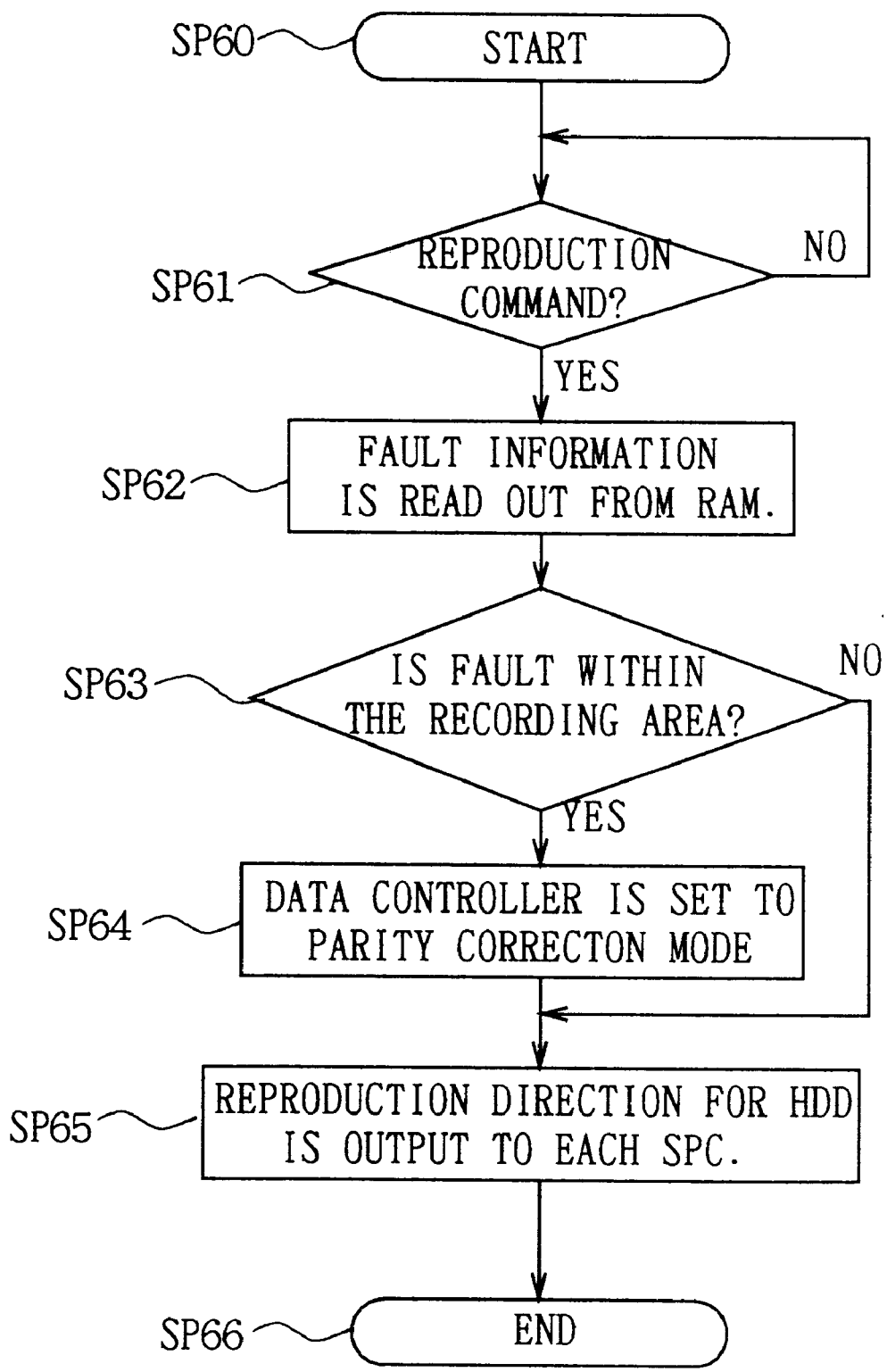
FIG. 6 is a flowchart showing the reproduction procedure.

FIGS. 5 and 6 are flowcharts of the recording processing and reproduction processing described above respectively.

The recording procedure in FIG. 5 is explained below in details.

When this processing is started (step SP50) and proceeds to step SP51, it is judged that whether or not the recording command is transmitted to the CPU 31.

When the recording command is not transmitted (when the result is "no"), the processing returns to step SP51 again to wait until the recording command is transmitted.

When the recording command is transmitted (when the result is "yes"), the processing proceeds to step SP52, where the recording direction control data for controlling to record the data input to each of the SPC 35A to 35H is output. Then, the processing proceeds to step SP53.

At step SP53, it is judged that whether or not the status information representing that whether or not the divided data $D11_A$ to $D11_G$ and the parity data $D11_P$ are recorded correctly in the HDD 33A to 33H is transmitted from the HDD 33A to 33H to the CPU 31.

When the status information is not transmitted (when the result is "no"), the processing returns to step SP53, and waits the status information to be transmitted.

Then, when the status information is transmitted (when the result is "yes"), the processing proceeds to step SP54, where it is judged that whether or not the transmitted status information are all "Good", that is, whether or not the status information representing that the divided data $D11_A$ to $D11_G$ are written correctly is returned.

When they are all "Good" (when the result is "yes"), the processing proceeds to step SP58, where the status information showing "Good" is transmitted to the SDC 13 via the bus 17.

On the contrary to this, when the status information are not all "Good" (there result is "no"), this shows that the divided data $D11_A$ to $D11_G$ has not been written correctly in any of HDD 33A to 33H (the status information in this case is "Check Condition"). At this time (when "no"), the processing proceeds to step SP55.

At step SP55, it is judged that whether or not the range of the recording error, i.e., the number of the HDD 33A to 33H in which the divided data $D11_A$ to $D11_G$ or the parity data $D11_P$ can not be recorded in correctly is within the range of a redundancy possible to be dealt by the parity correction processing. That is, it is judged that whether or not the number of errors is within the range which is possible to be corrected by the parity correction processing.

When it is within the redundancy (when the result is "yes"), that is, when the number of errors is within the parity-correctable range, the processing proceeds to step SP56, where the fault information relating to a recording error of HDD 33A to 33H or LBA of HDD 33A to 33H is written in the RAM 38. Then, the processing proceeds to step SP58, where the status information of "Good" is transmitted to the SDC 13 to terminate the processing (step SP59).

On the other hand, when the number of errors is not within the redundancy (when the result is "no"), the processing proceeds to step SP57, where the status information "Check Condition" representing that the data can not be recorded correctly is transmitted to the SDC 13 through the bus 17. Then, the processing is terminated (step SP59).

Next, referring to FIG. 6, the reproduction procedure is explained in details.

When this reproduction processing is started (step SP60), it is judged that whether or not the reproduction command is transmitted from the SDC 13 to the CPU 37 through the bus 17 (step SP61).

When the reproduction command is not transmitted (when the result is "no"), the processing returns to step SP61 again to wait until the reproduction command is transmitted. When the reproduction command is transmitted (when the result is "yes"), the processing proceeds to step SP62.

At step SP62, the fault information stored in the RAM 38 at the time of recording processing shown in FIG. 5 is read out. Next, the processing proceeds to step SP63.

At step SP63, based on the fault information which is read out from the RAM 38, it is judged that whether or not there is a portion where a recording error occurred at the time of recording the divided data $D11_A$ to $D11_G$ and the parity data $D11_P$ in the HDD 33A to 33H within the range of the divided data $D11_A$ to $D11_G$ to be reproduced shown by the reproduction command and the parity data $D11_P$.

When there is no fault in the reading area (when the result is "no"), the reproduction control direction for reproducing the divided data $D11_A$ to $D11_G$ and the parity data $D11_P$ from the HDD 33A to 33H is output to the SPC 35A to 35H (step SP65), and after the divided data $D11_A$ to $D11_G$ and the parity data $D11_P$ are reproduced, the processing proceeds to step SP66 to terminate the reproduction processing.

On the contrary to this, when it is judged based on the fault information that there is a fault within the reading area (when the result is "yes"), the data controller 32 is set to the parity correction mode, and a direction to reproduce the data stored in the HDD 33A to 33H is output to the SPC 35A to 35H so as to perform the reproduction processing actually. However, the divided data $D11_A$ to $D11_G$ and the parity data $D11_P$ which are reproduced from any of HDD 33A to 33H in which a recording error occurred are not waited, and the AV data D11 can be restored at the data controller 32 by the above-described parity correction processing.

Then, the processing proceeds to step SP66 and the reproduction processing is terminated.

As described above, at the time of recording the AV data D11 in the HDD 33A to 33H, when a recording error occurred in any of HDD 33A to 33H and when the recording error is within the redundancy, that is, when the error is within an extent being correctable by the parity correction, the fault information representing the portion where a recording error occurred is stored in the RAM 38, the fault information such that which of HDD 33A to 33H has an error or such as the position of LBS of the HDD 33A to 33H.

Then, at the time of reproducing the recorded AV data D11, if the reproduced data $D11_A$ to $D11_G$ to be read from the HDD 33A to 33H includes the portion where a recording error occurred, the data controller 32 is set to the parity correction mode, and the parity correction processing is performed from the remaining divided data $D11_A$ to $D11_G$ and the parity data $D11_P$ in which an recording error does not occur so as to restore the AV data D11 to be transmitted to the SDC 13.

Thereby, when a recording error occurred, if the error is within the redundancy, the SPC 35A to 35H does not record the data to the HDD 33A to 33H, so that the data output system for a broadcasting station which prevents the time loss due to repeatedly retry and which requires the real time characteristics can be constructed and controlled.

Also, the fault information is stored in the RAM 38 at the time of recording, and at the time of reproduction, the reproduction retry processing is not performed when the AV data D11 corresponding to the fault information is reproduced, and the parity correction is performed to correct an error so that the AV data D11 is restored.

Thereby, the time loss due to the retry processing can be prevented and the reproduction can be performed at a real time. Further, the time loss due to the retry processing can be prevented in recording and reproduction and the reproduction operation of the entire data output system 10, not only the RAID 18, can be executed at a real time.

Next, as the third embodiment, the following point will be described in details. The CPU 31 receives the reproduction command from the SDC 13 and outputs the reproduction direction to each of the SPC 35A to 35H. After that, when, within a predetermined period since the divided data $D11_A$ to $D11_G$ which is error correctable by the parity correction has been started to be read out from the minimum HDD 33A to 33G, the divided data $D11_A$ to $D11_G$ is not read out from the remaining one of HDD 33A to 33G, the operation mode of the data controller 32 is set to the parity correction mode. Then, the parity-correction is performed from the parity data $D11_P$ and the read divided data $D11_A$ to $D11_G$ so as to correct an error of the divided data $D11_A$ to $D11_G$ which is not read.

Figure 7:
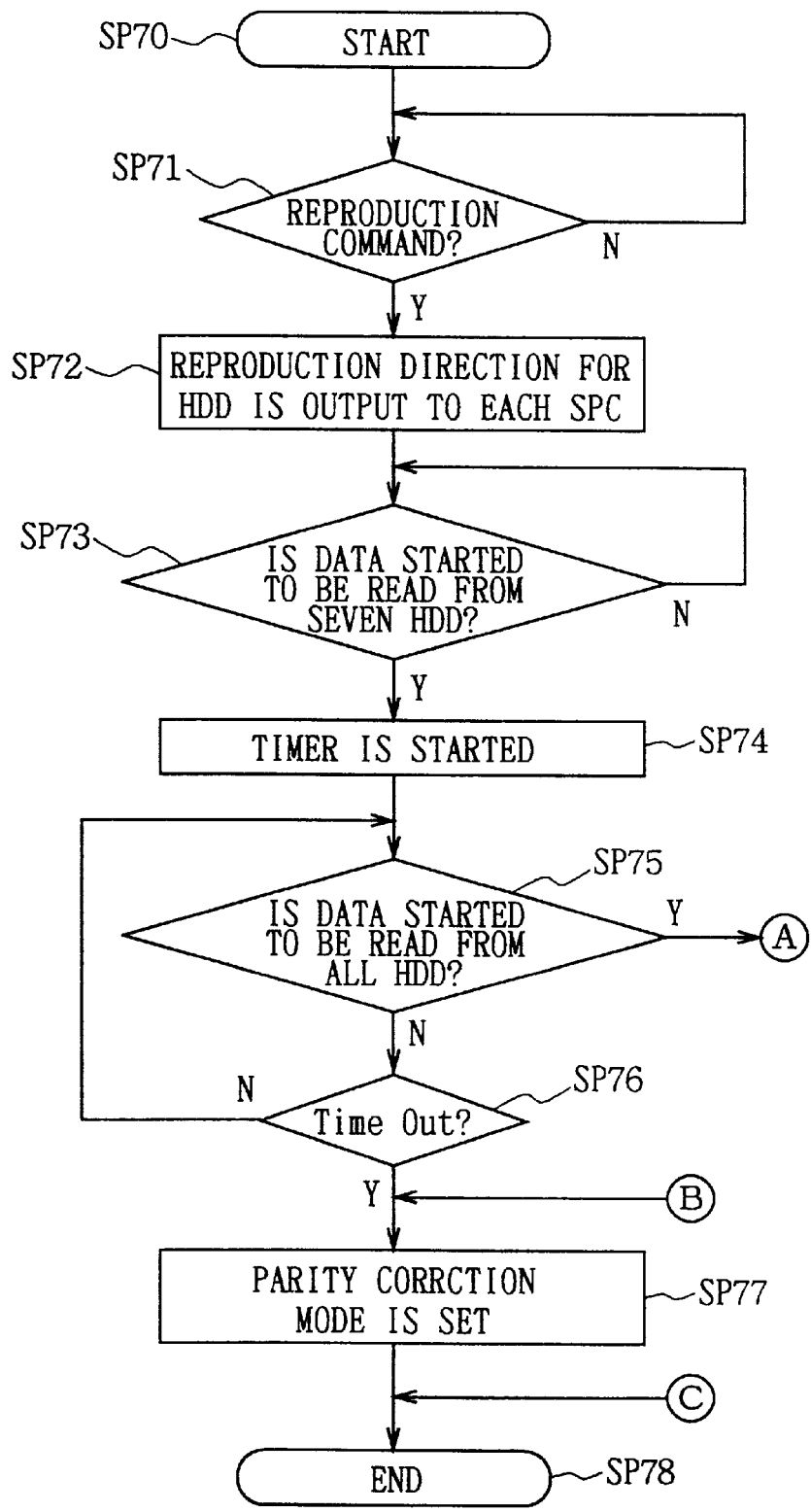
FIG. 7 is a flowchart showing the reproduction mode procedure.
Figure 8:
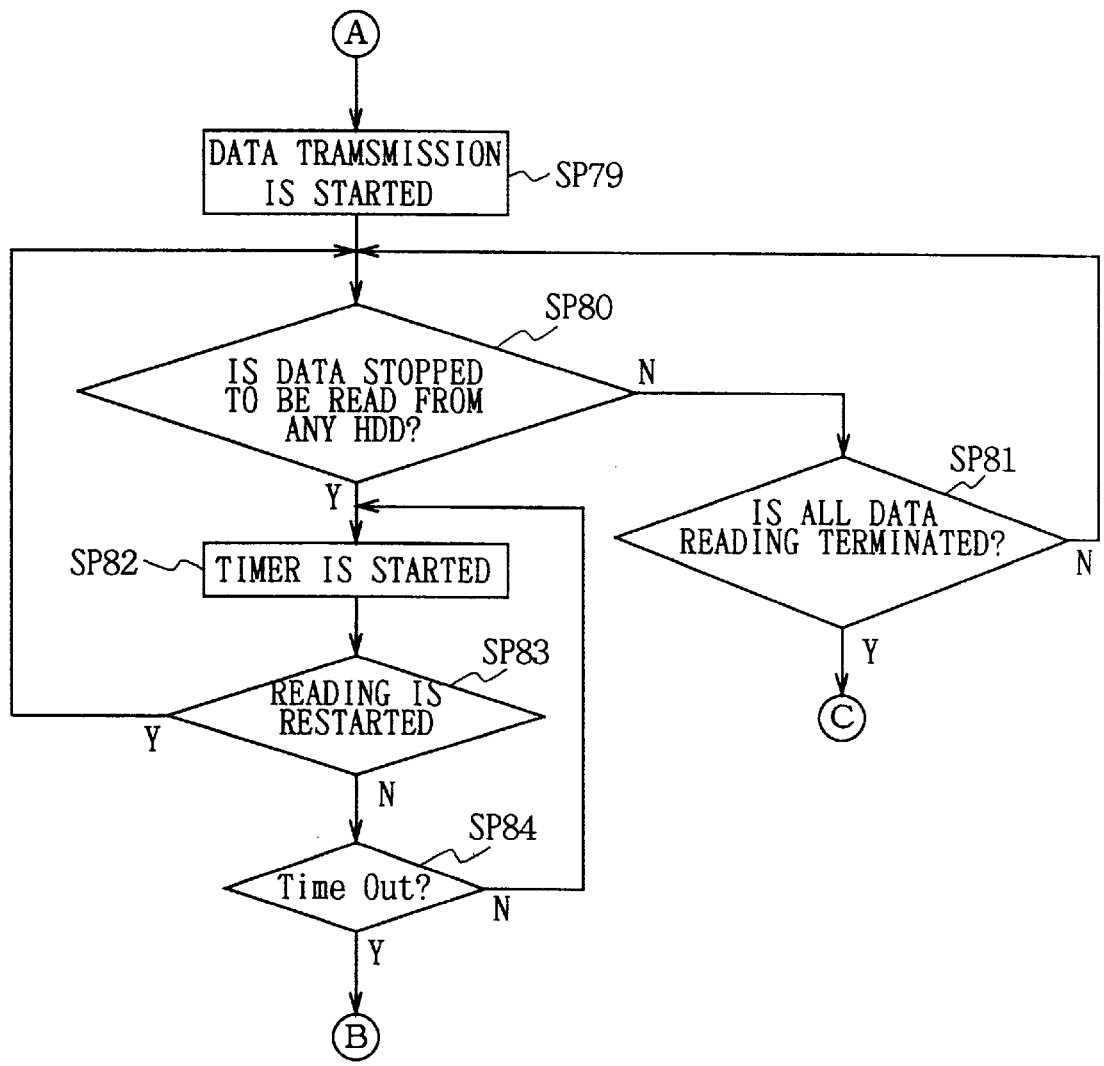
FIG. 8 is a flowchart showing the reproduction mode procedure.
Figure 9:
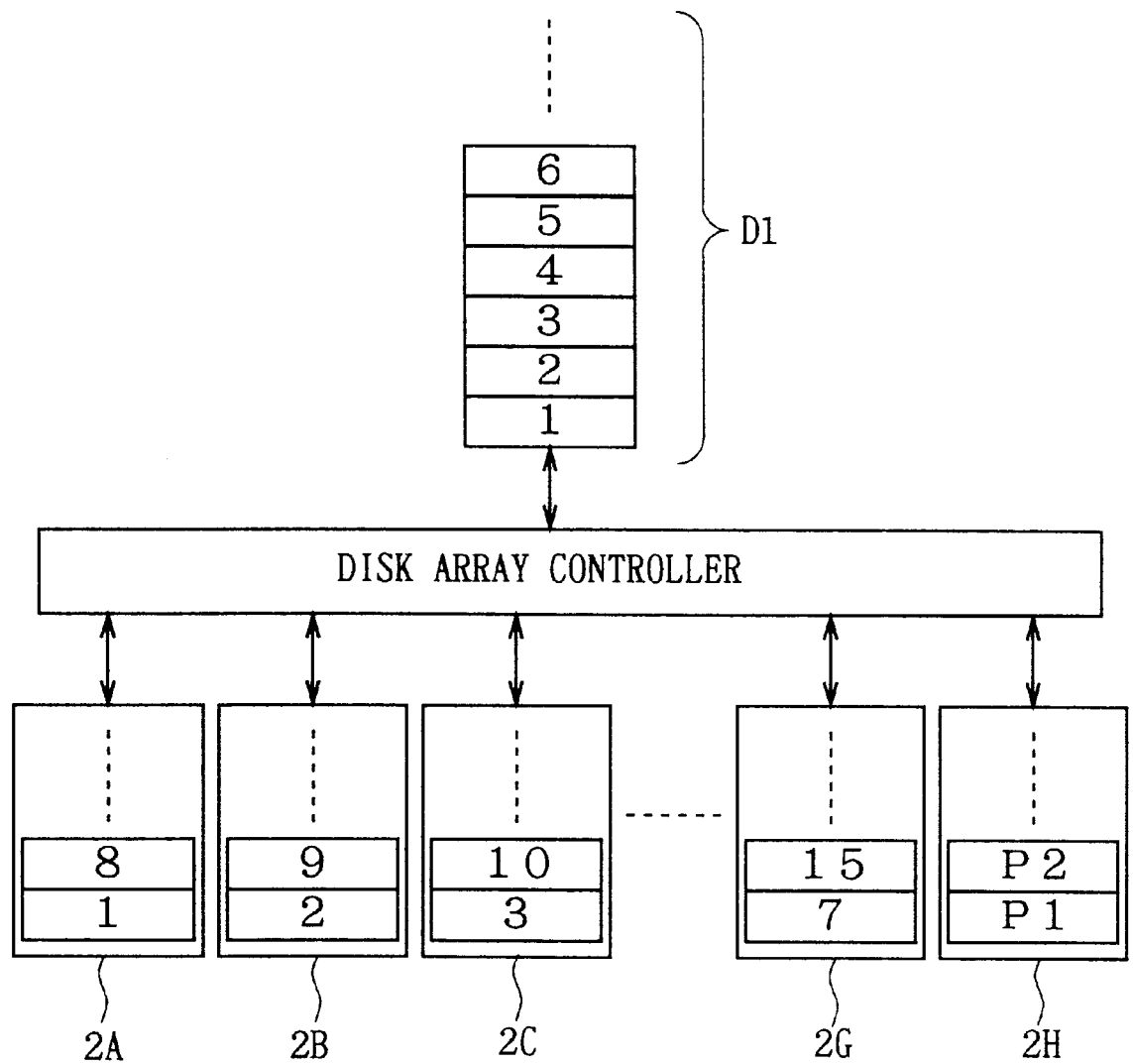
FIG. 9 is a schematically block diagram showing the general construction of a disk array apparatus.

FIGS. 7 and 8 are flowcharts of the reproduction processing.

When this reproduction processing is started (step SP70), the processing proceeds to step SP71, where it is judged that whether or not the reproduction command is transmitted from the SDC 13 to the CPU 31. When the reproduction command is not transmitted (when the result is "no"), the processing returns to step SP71 again to wait until the reproduction command is transmitted.

When the reproduction command is transmitted (when the result is "yes"), the processing proceeds to step SP72, where the reproduction control direction which controls the HDD 33A to 33H to reproduce the divided data $D11_A$ to $D11_G$ and the parity data $D11_P$ is output to the SPC 35A to 35H. Then, the processing proceeds to step SP73.

At step SP73, the CPU 31 monitors the operation of the SPC 35A to 35H, and waits the divided data $D11_A$ to $D11_G$ and the parity data $D11_P$ to be read out from seven HDD 33A to 33H among eight HDD 33A to 33H.

Then, when the divided data $D11_A$ to $D11_G$ and the parity data $D11_P$ are started to be read out from the seven HDD 33A to 33H, the processing proceeds to step SP74 to start the timer 37. Then, the processing proceeds to step SP75.

At step SP75, it is judged that whether or not the divided data $D11_A$ to $D11_G$ and the parity data $D11_P$ are all started to be read out from all HDD 33A to 33H.

When the data $D11_A$ to $D11_G$, $D11_P$ output all eight HDD are not started to be read out (when the result is "no"), the processing proceeds to step SP76, where it is judged that whether or not the timer started at step SP74 exceeds a predetermined period (time out). When it does not exceed a predetermined period (when the result is "no"), the processing proceeds to step SP75 again.

On the contrary to this, when the timer exceeds a predetermined period (time out) (when the result is "yes"), the data controller 32 is set to the parity correction mode, and the processing is terminated (step SP78).

Further, at step SP75, when it is judged that the data $D11_A$ to $D11_G$, $D11_P$ are started to be read out from all eight HDD 33A to 33H (when the result is "yes"), the processing proceeds to step SP79 in FIG. 8, where the controller 32 is set to the normal mode. Then, the AV data D11 is restored from the divided data $D11_A$ to $D11_G$ of the HDD 33A to 33H, to be transmitted to the SDC 13 through the bus 17. Then, the processing proceeds to step SP80.

At step SP80, the CPU 31 monitors the operation of the SPC 35A to 35H, so that it is judged that whether or not the divided data $D11_A$ to $D11_G$ and the parity data $D11_P$ are stopped to be read out from any of HDD 33A to 33H.

When the reading is not stopped and the data is normally read out (when the result is "no"), the processing proceeds to step SP81, where it is judged that whether or not the data specified by the reproduction command are all read out. If they are not all read out (when the result is "no"), the processing proceeds to step SP80 again. If the data are all read out (when the result is "yes"), the processing proceeds to step SP78, and the reproduction processing is terminated.

On the other hand, when the reading is stopped at step SP80 (when the result is "yes"), the processing proceeds to step SP82, where the timer 37 is started, thereafter, proceeds to step SP83, where the operation of the SPC 35A to 35H corresponding to the HDD 33A to 33H in which the reading is stopped are monitored, and it is judged that whether or not the data $D11_A$ to $D11_G$, $D11_P$ are restarted to be read out.

Here, when the reading is not restarted (when the result is "no"), the processing proceeds to step SP84, where it is judged that whether or not the count value of the timer started at step SP82 exceeds a predetermined value previously set. If it is not time out (if the result is "no"), the processing proceeds to step SP82, and if it is time out, the processing proceeds to SP77 in FIG. 7.

At step SP77, as described above, the data controller 32 is set to the parity correction mode, and the divided data $D11_A$ to $D11_G$ and the parity data $D11_P$ which read the data $D11_A$ to $D11_G$ which have not been read due to time out are error-corrected by the parity correction, so as to reconstruct the divided data again. Then, the AV data D11 is transmitted to the SDC 13.

As described above, at the time of reproduction, when, in a predetermined period from the time when the divided data $D11_A$ to $D11_P$ are started to be read from the minimum number of HDD 33A to 33H which can be parity-corrected, the divided data $D11_A$ to $D11_P$ are not read out from the remaining HDD 33A to 33H, the data controller 32 is set to the parity correction mode, and the divided data $D11_A$ to $D11_G$ which are not read are error-corrected by the parity operation from the divided data $D11_A$ to $D11_G$ and the parity data $D11_P$ which have been read.

Accordingly, the data outputting apparatus can be provided in which the AV data D11 can be restored by the data controller 32 at an early stage, and the time loss due to the restoring processing can be prevented so that the data can be recorded and reproduced at a real time.

This invention can be applied to the embodiments other than the first, second, and third embodiments described above. For example, the embodiments described above have dealt with the RAID of the RAID-3 structure which comprises one HDD for storing parity data. However, this invention is applicable to a RAID-5 or a RAID- 6 which comprise two HDD for parity data.

Furthermore, the embodiments described above have dealt with the case where a hard disk is used as a recording medium. However, other non-linear accessible recording medium such as the DVD and the MO can be used.

Industrial Applicability

In the broadcasting station, this invention can be utilized in the data storing and output system which stores and outputs AV data.

What is claimed is:

1. A data processing apparatus for recording data including video and/or audio data in a recording medium which can be non-linearly accessed, comprising:

recording means for dividing said input data into data each having a predetermined unit, and for respectively recording said divided data in a plurality of said non-linear accessible recording mediums;

counter means for counting elapsed time from the start of recording said data by said recording means; and main control means, when the status information representing whether or not said data is recorded in said non-linear accessible recording medium is not output from said recording medium in a predetermined period counted by said counter means, for deciding that an error occurred and for controlling said recording means to perform an error processing, said error processing writes fault information into a temporary storage device while said recording means records said data.

2. The data processing apparatus according to claim 1, wherein:

said recording means further comprises data control means for dividing said input data into data each having a predetermined unit and recording medium control means for receiving said data divided by said data control means and recording said data in said non-linear accessible recording medium; and said status information is output from said recording medium control means to said main control means, and said error processing is performed by said data control means.

3. The data processing apparatus according to claim 2, wherein:

a plurality of said non-linear accessible recording mediums are composed of a plurality of units wherein one unit consists of a predetermined number of said recording mediums;

said data control means divides said input data for each said unit and creates the parity data of said divided data, to output said divided data and said parity data to said recording medium control means which is composed for each said unit of said recording medium; and said data and said parity data are respectively recorded in said recording medium.

4. The data processing apparatus according to claim 1, further comprising storing means for storing data including the position information of said recording medium where an error occurred.

5. The data processing apparatus according to claim 1, further comprising input processing means which comprises encoding means for encoding said input data to format it thereby being recorded in said non-linear accessible recording medium and data control means for receiving said data encoded by said encoding means and controlling that which recording means said encoded data is output to among a plurality of said recording means; and wherein at least one input data among a plurality of input data is input to any of said input processing means among from a plurality of said input processing means in the assigned time slot.

6. A data processing method for recording data including video and/or audio data in a recording medium which can be non-linearly accessed, comprising:

the first step of dividing said input data into data each having a predetermined unit, and of respectively recording said divided data in a plurality of said non-linear accessible recording mediums;

the second step of counting elapsed time from the start of recording said data in said recording medium at said first step;

the third step of outputting the status information representing whether or not said data is recorded correctly in said recording medium at said first step;

the fourth step of deciding that an error occurred if said status information can not be obtained in a predetermined period counted at said third step, and performing an error processing; and the fifth step of writing fault information into a temporary storage device while recording said data.

7. A data processing apparatus for reproducing data including video and/or audio data recorded in a recording medium which can be non-linearly accessed, comprising:

reproducing means for reproducing said data which has been divided into data each having a predetermined unit and recorded in a plurality of said non-linear accessible recording mediums, and for restoring said divided and reproduced data to be output;

counter means for counting elapsed time from the start of reproducing said data by said reproducing means; and main control means, when the status information representing whether or not said data is reproduced from said non-linear accessible recording medium is not output in a predetermined period counted by said counter means, for deciding that an error occurred and for controlling said reproducing means to perform an error processing.

8. The data processing apparatus according to claim 7, wherein:

said reproducing means comprises recording medium control means for reproducing said data recorded in said non-linear accessible recording medium and data control means for restoring said data output from said recording medium control means to be output; and said status information is output from said recording medium control means to said main control means, and said error processing is performed by said data control means.

9. The data processing apparatus according to claim 8, wherein:

a plurality of said non-linear accessible recording mediums are composed of a plurality of units wherein one unit consists of a predetermined number of said recording mediums; and said recording medium control means reproduces the parity data recorded in said non-linear accessible recording medium, and said data control means, in said error processing, performs error correction by parity-correcting, from said parity data and said data which are reproduced, on said data of said recording medium from which said status information is not output.

10. The data processing apparatus according to claim 8, further comprising storing means for storing data including the position information of said recording medium where an error occurred.

11. The data processing apparatus according to claim 7, further comprising output processing means which comprises data control means for rearranging said data reproduced by said reproducing means into input data, and decoding means for decoding said data output from said data control means to format it thereby being output to the outside; and wherein output data is output to the outside from one output processing means among a plurality of said output processing means in the assigned time slot.

12. A data processing method for reproducing data including video and/or audio data recorded in a recording medium which can be non-linearly accessed, comprising:

the first step of reproducing said data which has been divided for each predetermined unit and recorded in a plurality of said non-linear accessible recording mediums, and of restoring said divided and reproduced data;

the second step of counting elapsed time from the start of reproducing said data from said recording medium at said first step;

the third step of outputting the status information representing whether or not said data is reproduced correctly at said first step; and the fourth step, if said status information can not be obtained in a predetermined period counted at said third step, of deciding that an error occurred and performing an error processing.

13. A data processing apparatus for recording data including video and/or audio data in a non-linear accessible recording medium and for reproducing said data recorded in said non-linear accessible recording medium, comprising:

recording and reproducing means for dividing said input data for each predetermined unit to be recorded in a plurality of said non-linear accessible recording mediums, and for reproducing said data which has been recorded in said recording medium for each predetermined unit to be restored;

main control means, when the status information representing whether or not said data is recorded in said non-linear accessible recording medium is not output from said recording means in a predetermined period counted by said counter means, for deciding that an error occurred and for controlling said recording means to perform an error processing, said error processing writes fault information into a temporary storage device while said recording and reproducing means records and reproduces said data.

14. The data processing apparatus according to claim 13, wherein:

a plurality of said non-linear accessible recording mediums are composed of a plurality of units wherein one unit consists of a predetermined number of said recording mediums;

said recording and reproducing means divides said input data for each said unit and creates the parity data of said divided data, to record said divided data and said parity data in said recording medium, and said control means, in the error correction, restores said data which can not be reproduced due to said recording error from said data reproduced by said recording and reproducing means and the parity data.

15. The data processing apparatus according to claim 13, further comprising input output processing means which comprises: encoding means for encoding said input data to format it thereby being recorded in said non-linear accessible recording medium; data control means for receiving said data encoded by said encoding means and controlling that which recording medium said encoded data is recorded in among a plurality of said recording mediums, and at the same time, for rearranging said input data reproduced by said recording reproducing means; and decoding means for decoding said data output from said data control means to format it thereby being output to the outside; and wherein said data is input from one of said input output processing means among a plurality of said input output processing means in the assigned time slot, and said data is output to the outside.

16. The data processing method for recording data including video and/or audio data in a non-linear accessible recording medium and for reproducing said data recorded in said non-linear accessible recording medium, comprising:

the first step of dividing said input data for each predetermined unit, and of recording said divided data in a plurality of said non-linear accessible recording mediums;

the second step of recording fault information into a temporary storage device, including the position of said recording medium where a recording error occurred, at the time of recording said data in said recording medium at said first step; and the third step of error-correcting said data if said recording error exists in said recording medium in which said reproduced data is recorded, based on said fault information which had been recorded at said second step while reproducing recorded error-free data in said recording medium, and restoring said divided and recorded data that includes errors.

17. The data processing method according to claim 16, wherein:

a plurality of said non-linear accessible recording mediums are composed of a plurality of units wherein one unit consists of a predetermined number of said recording mediums;

said first step divides said input data for each said unit and creates the parity data of said divided data, to record said divided data and said parity data in said recording medium; and said third step, in the error correction, restores said data which can not be reproduced due to said recording error from said reproduced data and said parity data.

18. A data processing apparatus for reproducing data including video and/or audio data recorded in a non-linear accessible recording medium, comprising:

reproducing means for reproducing said data which has been divided for each predetermined unit and recorded in a plurality of said recording mediums, and for restoring said reproduced data to be output; and control means, when the reproduction data having error correctable size is reproduced by said reproducing means and the remaining reproduction data is not reproduced by said reproducing means in a predetermined period from the time when said divided and recorded data is started to be reproduced, for error-correcting said data which is not reproduced from said data which can be reproduced, and for controlling said reproducing means to restore said data.

19. The data processing apparatus according to claim 18, wherein:

a plurality of said non-linear accessible recording mediums are composed of a plurality of units wherein one unit consists of a predetermined number of said recording mediums;

said data is divided for each said unit to be recorded in said recording medium, and the parity data of said data is recorded in said recording medium; and said control means, in the error correction, restores from said data and said parity data reproduced by said reproducing means said remaining data which can not be reproduced.

20. The data processing apparatus according to claim 18, further comprising output processing means which comprises data control means for rearranging said data reproduced by said reproducing means into input data, and decoding means for decoding said data output from said data control means to format it thereby being output to the outside; and wherein said data is reproduced from one output processing means among a plurality of said output processing means in the assigned time slot, to be output to the outside.

21. A data processing method for reproducing data including video and/or audio data recorded in a recording medium which can be non-linearly accessed, comprising:

the first step of reproducing said data which has been divided for each predetermined unit and recorded in a plurality of said non-linear accessible recording mediums; and the second step, when the reproduction data having an error correctable size is reproduced at said first step and the remaining reproduction data is not reproduced at said first step in a predetermined period from the time when said divided and recorded data is started to be reproduced, said data which is not reproduced is error-corrected from said data which can be reproduced to restore said data.

* * * * *